Feb. 14, 1961 W. PEGLOW 2,971,668
DISH RACK
Filed Dec. 28, 1956 2 Sheets-Sheet 1
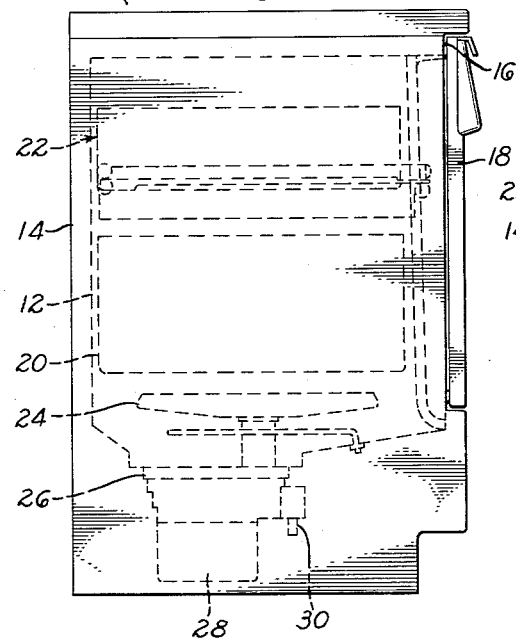
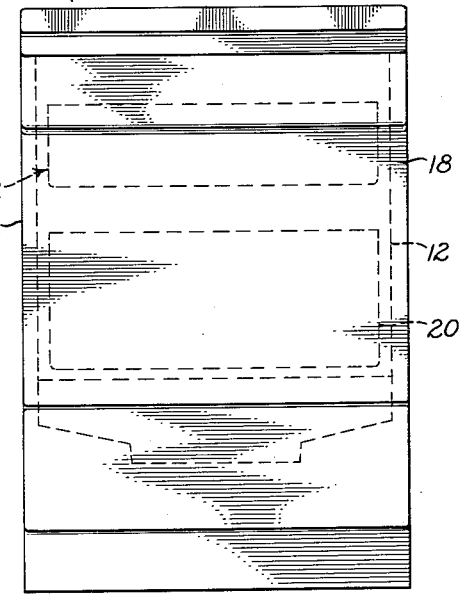
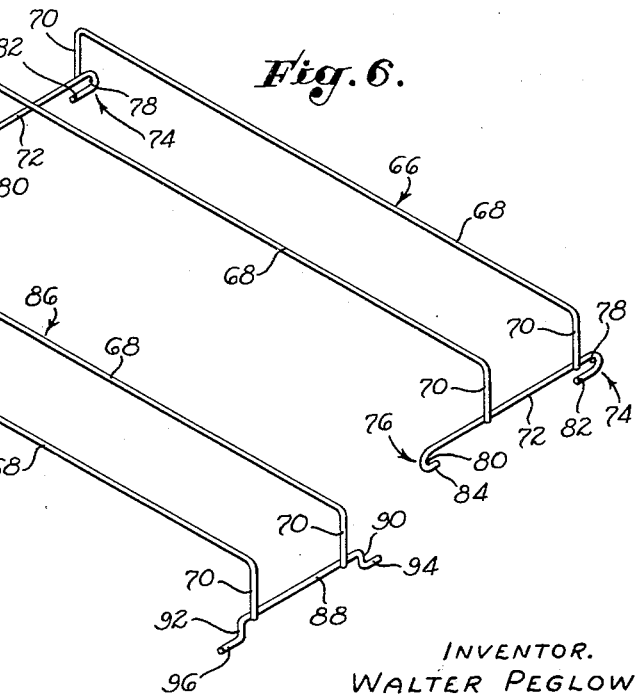
INVENTOR.
WALTER PEGLOW
BY HIS ATTORNEYS.
HARRIS, KIECH, FOSTER & HARRIS Feb. 14, 1961  W. PEGLOW  2,971,668
DISH RACK
Filed Dec. 28, 1956  2 Sheets-Sheet 2
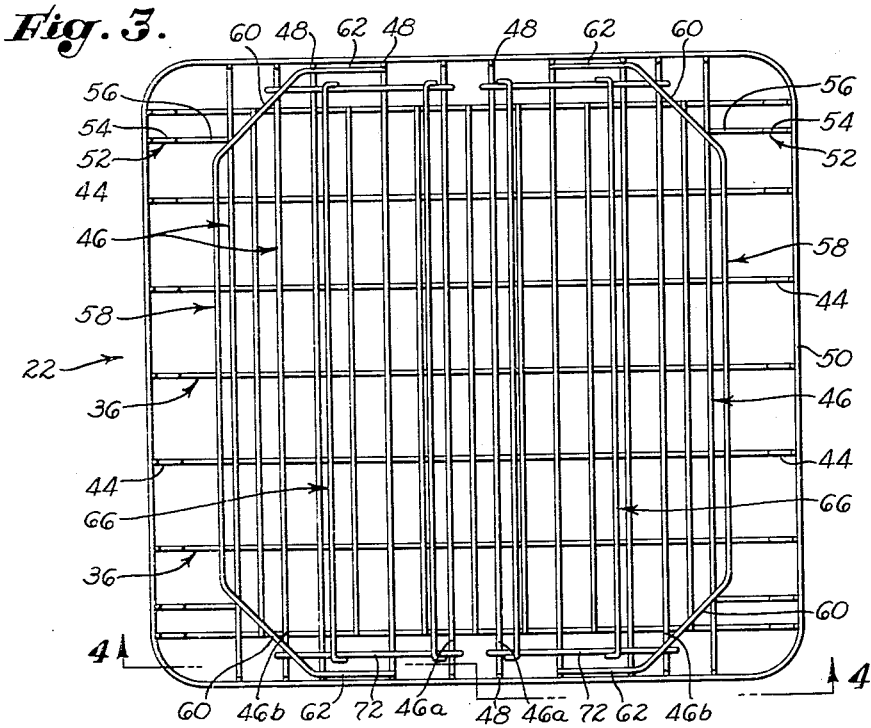
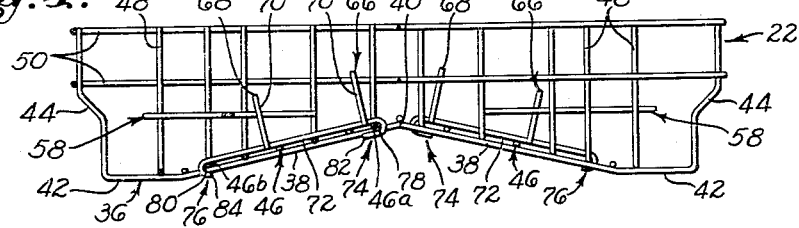
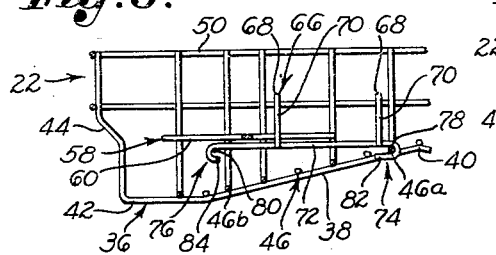 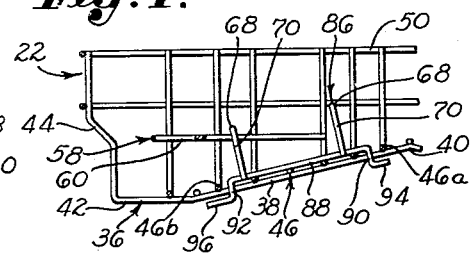
INVENTOR.
WALTER PEGLOW
BY HIS ATTORNEYS.
HARRIS, KIECH, FOSTER & HARRIS

United States Patent Office 2,971,668
Patented Feb. 14, 1961

2,971,668

DISH RACK

Walter Peglow, Whittier, Calif., assignor to Waste King Corporation, Los Angeles, Calif., a corporation of California Filed Dec. 28, 1956, Ser. No. 631,370

4 Claims. (Cl. 220—19)

The present invention relates in general to dishwashers and, more particularly, to a rack for supporting within a dish chamber articles to be washed and rinsed, and preferably dried, therein.

A primary object of the invention is to provide a dish rack for the foregoing purposes which includes a basket comprising an open framework and which includes one or more inserts releasably securable to such framework and provided with retaining members particularly designed to retain such articles as glasses, cups, and the like, in inverted positions to receive therein a water spray directed upwardly throughout the dish chamber.

With this construction, such inserts may be mounted on the basket forming the dish rack when it is desired to place articles of the nature mentioned in the rack, and may be removed when it is desired to place other articles in the rack, a related object being to provide inserts which may be stored in the rack itself merely by inverting them when it is desired to place articles other than glasses, cups, and the like, in the rack.

Another object of the invention is to provide a dish rack having one or more inserts which are releasably securable to the open framework of the basket in such a way that they may readily be removed when necessary, but are not subject to inadvertent removal or dislodgment upon removal of articles therefrom. In other words, while each insert is susceptible of easy intentional removal, it cannot be removed or dislodged accidentally, as by removing from the insert a glass or cup which may be wedged relative to retaining members of the insert.

A further object of the invention is to provide a dish rack wherein each of one or more inserts includes locking elements withdrawably insertable under portions of the framework of the basket, and includes stops engageable with portions of the basket framework which are so spaced relative to the stops that limited movement of the insert is possible to permit insertion of one of the locking elements under, or withdrawal thereof from under, a portion of the basket framework when installing or removing the insert.

Another object is to provide a dish rack wherein the spacing of the locking elements, the spacing of the portions of the basket framework which are engageable by the locking elements, the spacing of the stops, and the spacing of the portions of the basket framework which are engageable by the stops are all so related that one of the locking elements can be withdrawn from under the corresponding portion of the framework when one of the stops is in engagement with the portion of the framework corresponding thereto, but, under no other conditions. This permits removal of the insert by following a predetermined manipulative procedure, it being necessary to manipulate the insert in a certain way to withdraw one of the locking elements from under the corresponding portion of the basket framework, whereupon the other locking element may be withdrawn from under the portion of the framework corresponding thereto. This procedure cannot be duplicated by normal removal of glasses, cups, and the like, from the insert so the accidental removal or dislodgement of the insert is prevented, which is an important feature of the invention.

The foregoing objects, advantages, features and results of the present invention, together with various other objects, advantages, features and results thereof which are inherent in the structures defined by the claims hereinafter presented, or which will be evident to those skilled in the art in the light of this disclosure, may be attained with the exemplary embodiments of the invention described in detail hereinafter and illustrated in the accompanying drawings, in which:

Fig. 1 is a side elevational view of a dishwasher which incorporates the dish rack of the invention;

Fig. 2 is a front view of the dishwasher;

Fig. 3 is a plan view of the dish rack of the invention;

Fig. 4 is a view, partially in section and partially in elevation, taken along the arrowed line 4—4 of Fig. 3;

Fig. 5 is a fragmentary sectional view duplicating a portion of Fig. 4, but illustrating an insert of the invention in a partially removed position;

Fig. 6 is a perspective view of the insert illustrated in Figs. 3, 4 and 5;

Fig. 7 is a fragmentary sectional view similar to a portion of Fig. 4, but illustrating an alternative insert embodiment of the invention; and Fig. 8 is a perspective view of the alternative insert embodiment shown in Fig. 7.

Referring to Figs. 1 and 2 of the drawings, the numeral 10 designates a housing structure which includes an inner dish chamber 12 enclosed by an outer cabinet 14, the housing structure being provided at the front thereof with a doorway 16 which provides access to the interior of the dish chamber 12 and which is adapted to be closed by a door 18. Within the dish chamber 12 and accessible through the doorway 16 are lower and upper dish racks 20 and 22, the latter embodying the present invention as hereinafter described. Within the dish chamber 12 below the lower dish rack 20 is an impeller 24 for spraying water upwardly throughout the dish chamber in an upwardly divergent, generally conical pattern. Any suitable additives, such as detergents, water softeners, soaps, drying agents, and the like, may be present in the water sprayed upwardly by the impeller 24 in this manner. In the particular construction illustrated, the impeller 24 is of the reaction type and is supplied with water from the bottom of the dish chamber 12 by a pump 26 the inlet of which communicates with the bottom of the dish chamber. This pump is driven by a motor 28 and is provided with an outlet which is selectively connectible to the impeller 24 and to a drain 30 so that the pump may be utilized to deliver water from the bottom of the dish chamber 12 to either the impeller 24, or to the drain 30.

The dish rack 22 takes the form of a basket comprising an open framework which includes transverse supporting members 36 each having portions 38 which slope outwardly and downwardly from a central apex 40, horizontal portions 42 outwardly of the sloping portions 38, and generally upright portions 44 at the ends of the horizontal portions 42. Secured to the transverse supporting members 36, as by welding, are longitudinal supporting members 46 which are disposed on top of the transverse supporting members in the construction illustrated. Certain of the longitudinal supporting members 46 merely span the transverse supporting members 36, while others extend therebeyond and are provided at their ends with generally upright portions 48. The upright portions 44 of the transverse supporting member 36 and the upright portions 48 of certain of the longitudinal supporting members 46 are encircled by frame members 50 suitably secured thereto, as by welding. Auxiliary members 52 are provided having generally upright portions 54 secured to the frame members 50 and horizontal portions 56 secured to the outermost of the longitudinal supporting members 46. The upright portions 54 and the horizontal portions 56 of the auxiliary members 52 parallel the upright portions 44 and the horizontal portions 42 of the transverse supporting members 36. Longitudinal rail members 58 parallel the longitudinal supporting members 46 above the bottom of the rack 22 and are disposed adjacent the respective sides of the rack in spaced relation with such sides. The rail members 58 are provided at their ends with diagonal portions 60 terminating in transverse portions 62 secured to certain of the upright portions 48 forming extensions of certain of the longitudinal supporting members 46.

It will be noted that the outwardly and downwardly sloping portions 38 of the transverse supporting members 36 dispose the longitudinal supporting members 46 connected to such sloping portions in outwardly and downwardly sloping planes with the longitudinal supporting members nearest the center of the rack at higher elevations than the longitudinal supporting members farthest from the rack center. Consequently, when glasses, cups, or the like, are placed on the longitudinal supporting members 46 in inverted positions, articles of the nature mentioned face downwardly and inwardly toward the center of the upwardly divergent spray produced by the impeller 24 to insure spraying of water, with or without suitable additives, into the interiors of such articles.

To hold such articles as cups, glasses, and the like, in the downwardly and inwardly inclined inverted positions mentioned, the invention provides the rack 22 with inserts 66 which are releasably secured to the open framework of the rack in such a manner that they can be removed readily by means of a predetermined manipulative procedure which cannot be duplicated inadvertently. Thus, while the inserts 66 may be removed intentionally, they cannot be removed or dislodged unintentionally, as when removing cups, glasses, and the like therefrom, which is an important feature of the invention. The inserts 66, while oppositely oriented, are identical so that only one will be considered.

Each insert 66 includes two longitudinally extending retaining members 68 between which cups, glasses, and the like may be placed, and which are provided at their ends with portions 70 extending downwardly to and secured to locking members 72, as by welding the end portions 70 of the retaining members to the locking members. The locking members 72 extend transversely of the longitudinal supporting members 46 and rest thereon, as best shown in Fig. 4 of the drawings.

Each locking member 72 is provided at its ends with U-shaped hooks 74 and 76 respectively adapted to hook around two of the longitudinal supporting members 46 which are designated by the reference characters 46a and 46b for convenience. The base portions of the U's forming the hooks 74 and 76 provide stops 78 and 80 respectively engageable with the supporting members 46a and 46b. The spacing between the stops 78 and 80 exceeds the spacing between the supporting members 46a and 46b to permit transverse movement of the insert 66 relative to the longitudinal supporting members 46.

The hooks 74 and 76 provide long and short locking elements 82 and 84 respectively insertable under the supporting members 46a and 46b to prevent upward removal of the insert 66. Thus, when the locking elements 82 and 84 are inserted under the supporting members 46a and 46b, the insert cannot be removed by any upward force applied thereto, as by removal of a cup, glass, or the like, from between the retaining members 68.

The spacing between the supporting members 46a and 46b, the spacing between the stops 78 and 80, and the spacing between the free ends of the locking elements 82 and 84 are so related that, as will be apparent from Fig. 4, when the stop 80 is in engagement with the supporting member 46b, the locking element 82 cannot be withdrawn from under the supporting member 46a. Because of the downward slope of each locking member 72 toward the hook 76 thereof resulting from the positioning of the supporting members 46a and 46b in a downwardly sloping plane with the supporting member 46a at a higher elevation than the supporting member 46b, any upward force applied to the insert 66 in removing a cup, glass, or the like, therefrom causes the stop 80 to engage the supporting member 46b to prevent detachment of the insert. In other words, with the construction illustrated, an upward force applied to the insert tends to slide it up the slope on which it rests to insure insertion of the locking element 84 of each locking member 72 under the supporting member 46b.

However, the relationship between the spacing of the supporting members 46a and 46b, the spacing of the stops 78 and 80, and the spacing of the free ends of the locking elements 82 and 84 is such that the locking element 84 of each locking member 72 may be withdrawn from under the supporting member 46b by sliding the insert 66 downwardly until the stop 78 is in engagement with the supporting member 46a. Under such conditions, the hook 76 of each locking member 72 may be disengaged from the supporting member 46b, as shown in Fig. 5 of the drawings. Subsequently, the insert 66 may be moved to the right, as viewed in Fig. 5, to withdraw the locking element 82 from under the supporting member 46a, thereby completing the removal of the insert 66.

Thus, while each insert 66 cannot be dislodged or removed accidentally, as in response to an upward force applied thereto in removing a cup or glass from between the retaining members 68, the insert can readily be removed by following the predetermined manipulative procedure outlined, the insert first being moved to the left, as viewed in Figs. 4 and 5, to disengage the hook 76 from the supporting member 46b, and then being moved to the right to disengage the hook 74 from the supporting member 46a.

Referring now to Figs. 7 and 8 of the drawings, illustrated therein is an insert 86 for use with the rack 22 which includes the retaining members 68 having the end portions 70 connected to locking members 88 similar to the locking members 72. Each locking member 88 is provided with stops 90 and 92 having a spacing different from the spacing between the supporting members 46a and 46b to permit transverse movement of the insert 86 relative to the supporting members. In this embodiment, the spacing between the stops 90 and 92 is less than the spacing between the supporting members 46a and 46b. Forming part of each locking member 88 adjacent the respective stops 90 and 92 are short and long locking elements 94 and 96 respectively insertable under the supporting members 46a and 46b to prevent upward removal of the insert 86.

As will be apparent, the relation between the spacing of the supporting members 46a and 46b, the spacing between the stops 90 and 92, and the spacing between the free ends of the locking elements 94 and 96 is such that when the stop 90 is seated against the supporting member 46a, the locking element 96 cannot be withdrawn from under the supporting member 46b, and is such that when the stop 92 is in engagement with the supporting member 46b, the locking element 94 can be withdrawn from under the supporting member 46a. Any upward force applied to the insert 86 in removing a cup, glass, or the like, from between the retaining members 68 tends to move the insert 86 up the slope formed by the longitudinal supporting members 46 to maintain insertion of the locking element 94 of each locking member 88 under the supporting member 46a. Thus, the insert 86 cannot be removed or dislodged accidentally.

However, when removal of the insert 86 is desired, it is merely necessary to move it transversely of the longitudinal supporting members 46 until the stop 92 engages the supporting member 46b, whereupon the right side of the insert 86, as viewed in Fig. 7 of the drawings, may be moved upwardly to withdraw the locking elements 94 from under the supporting member 46a. Subsequently, by moving the insert 86 to the right and upwardly, the locking elements 96 can be withdrawn from under the supporting member 46b.

Although exemplary embodiments of the invention have been disclosed herein for purposes of illustration, various changes, modifications and substitutions may be incorporated in such embodiments without departing from the spirit of the invention as defined by the claims which follow.

I claim:

1. In a dish rack, the combination of: an open-framework basket including generally horizontally spaced, parallel, wire-like supporting members; and an open-framework insert including a wire-like locking member positioned crosswise of said supporting members and having a central portion seated on and supported by at least some of said supporting members, said locking member having at the ends of said central portion integral, downwardly extending stop portions which are engageable with two of said supporting members, respectively, said locking member having at the lower ends of said stop portions integral end portions which are downwardly offset from and substantially parallel to said central portion, which are substantially axially aligned with each other and face in opposite directions, and which are inserted under said two supporting members, respectively, the distance between said stop portions differing from the distance between said two supporting members.

2. A dish rack as set forth in claim 1 wherein said end portions are of different lengths.

3. A dish rack according to claim 2 wherein said end portions face toward each other and wherein the distance between said stop portions exceeds the distance between said two supporting members.

4. A dish rack according to claim 2 wherein said end portions face away from each other and wherein the distance between said stop portions is less than the distance between said two supporting members.

References Cited in the file of this patent

UNITED STATES PATENTS

| | | |
|---|---|---|
| 381,135 | Hicks | Apr. 17, 1888 |
| 1,270,631 | Lewis | June 25, 1918 |
| 1,466,514 | Smythe | Aug. 28, 1923 |
| 1,604,608 | Ryerson | Oct. 26, 1926 |
| 2,841,288 | Field et al. | July 1, 1958 |
| 2,846,941 | Goodwin | Aug. 12, 1958 |